May 2, 1961     A. V. HIGHLAND     2,982,045
BAIT MINNOW DIPPER AND HOLDER
Filed Oct. 3, 1960
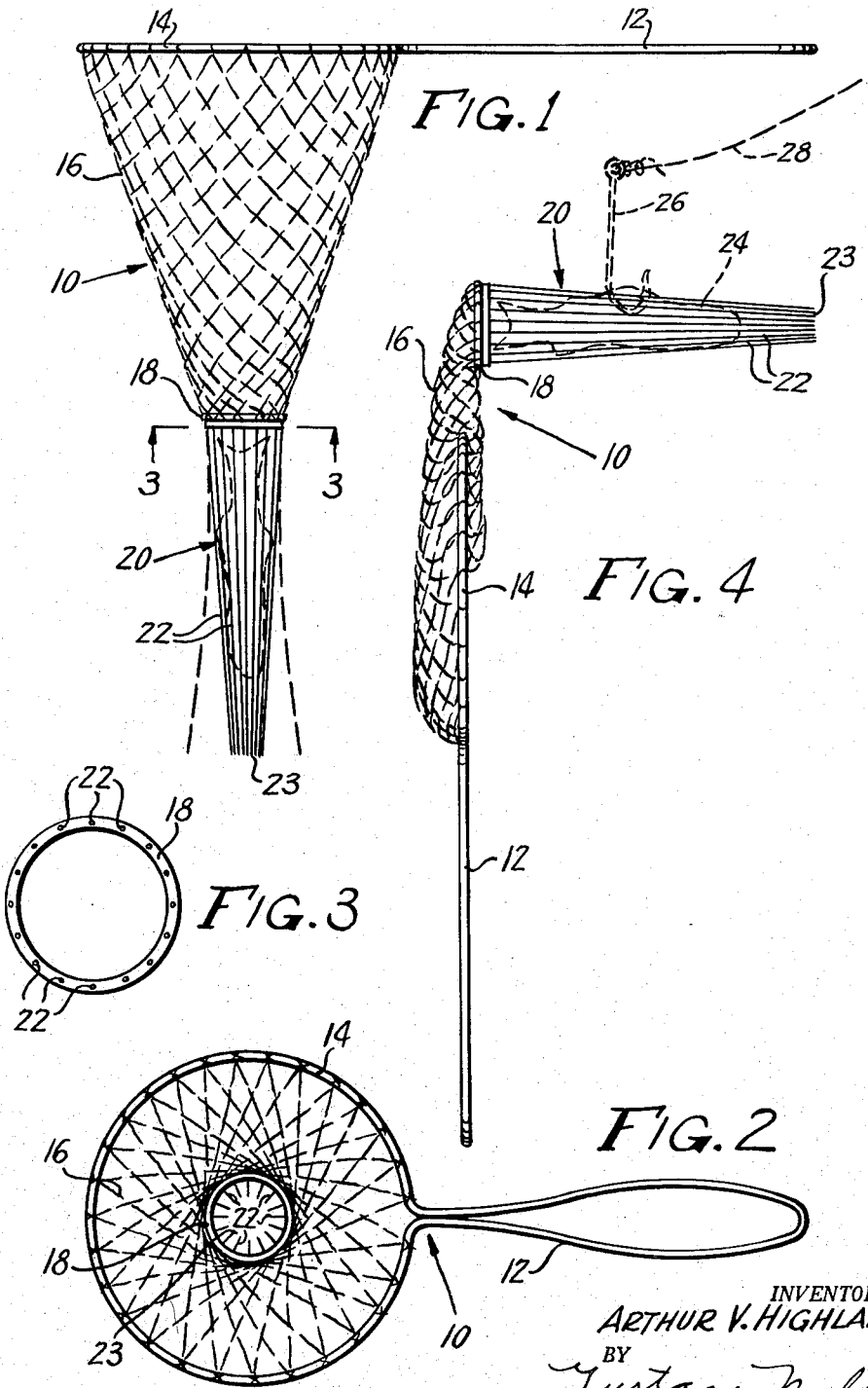
INVENTOR.
ARTHUR V. HIGHLAND
BY
Gustave Miller
ATTORNEY

2,982,045
BAIT MINNOW DIPPER AND HOLDER
Arthur V. Highland, 1002 N. 8th St., Moorhead, Minn.

Filed Oct. 3, 1960, Ser. No. 60,098

6 Claims. (Cl. 43—4)

This invention relates to a live bait minnow dipper and holder for managing the live bait and holding the live bait in removing it from the bait box until the time the bait minnow is hooked on the fish hook ready to be used in the fishing operation.

It is an object of this invention to provide a live bait dipper and holder for handling or managing a live minnow in the process of inserting the fish hook into the minnow in such manner that neither the minnow is harmed by excessive handling, or being dropped into the boat bottom or elsewhere, nor is the operator in danger of injuring himself with the fish hook while in the process of hooking the bait minnow.

A further object of this invention is to provide a minnow dipper and holder which manages the bait minnow completely from the bait box to the water during the process of inserting the fish hook therein without danger of either the minnow escaping to injure itself, or the operator hooking himself while proceeding to hook the minnow.

A further object of this invention is to provide a live bait minnow holder and dipper which can be dipped into a live bait minnow holding pail, to entrap a single live minnow and hold it in a convenient position for inserting the fish hook without having to manually hold the minnow and then, for removing the hooked minnow from the holder with the fish hook in place, ready for use.

Still a further object of this invention is to provide a live bait minnow holder and dipper consisting generally of a funnel shaped combination fish net for catching the minnow in the bait pail and leading it to a spring wire trap for holding the minnow while the fish hook is inserted therein, after which the hooked minnow can be readily withdrawn from the trap for fishing use.

In brief, the minnow holder and dipper of this invention consists of a funnel shaped device wherein the large cone end serves for dipping into a bait pail to trap at least one minnow therein, and connected thereto is a small cone shaped wire trap of spring wires, having an opening from the bottom of the fish net of a size only to pass one minnow therethrough and hold the minnow therein against escape therefrom under its own weight or action, whereupon any additional minnows caught in the dip portion of the funnel may be released by turning the handle attached thereto, and then the entire device is withdrawn from the tackle pail enabling a fish hook to be inserted in the minnow between the spring fingers or wires.

With the above and related objects in view, the present invention consists in the details of construction and combination of parts, as will be more fully understood from the following description, when read in conjunction with the accompanying drawing, in which:

Fig. 1 is an elevational view of the live bait minnow dipper and holder of this invention.

Fig. 2 is a top plan view of Fig. 1.

Fig. 3 is a sectional view on line 3—3 of Fig. 1, showing the connecting collar.

Fig. 4 is an elevational view of the minnow dipper and holder in the position with a fish hook inserted through the minnow in the top portion thereof.

There is shown at 10 the bait minnow holder and dipper of this invention as consisting of a funnel shaped member comprising a handle 12 extending from a circular loop 14. Secured on the circular loop 14 is an inverted cone-shaped fish net 16 having a small open end secured to a collar 18.

The collar 18 is made of a somewhat rigid material and extending from the side of the collar 18 opposite to the fish net 16 are a plurality of spring fingers 22 which extend longitudinally, but in a somewhat converging cone shown generally at 20, and terminating in a small open end 23.

The handle 12 and loop 14 are made of a suitable rigid material which may be a wire, as shown, of metal or of any other material suitable therefor. The net 16 may be of fabric net material of either natural or synthetic fibres. The collar 18 may be of metal or high impact plastic. The spring fingers 22 may be of spring wire, or even of a suitable plastic having the proper elastic yet rigid properties.

As apparent from the drawing, when suspended as in Fig. 1, the device looks like a conventional funnel, with a large inverted cone open at both ends, the larger end secured to the handle, the smaller end secured to a collar which, in turn, is secured to a small inverted cone consisting of the longitudinally extending spring fingers open at both ends, the larger end of the small cone being substantially the same size as the smaller end of the large cone.

In operation, the holder and dipper is held by the handle 12 and inserted into a bait pail having live minnows swimming around, so as to catch one or more minnows in the catcher or holder formed by the net 16. Then, by raising it up slightly, one and only one of the minnows will be forced to enter through the collar 18 into the lower inverted cone or trap 20, the resiliency of the spring fingers 22 being such that the minnow 24 entered into the trap or cone 20 cannot, of its own weight or activity, pass through the small open end 23.

Then, the trap or cone 20 may be held in one hand and the handle 12 turned to release any additional minnows that may be in the holder net 16, and the device is removed from the bait box letting the handle hang down as in Fig. 4 and holding the trap 20 in one hand. This, of course, closes the entrance to the trap or cone 20 and keeps the minnow from backing out. Then, a fish hook held in the other hand on a fish line 28 is inserted between any two spring fingers 22 into the minnow 24, as shown in Fig. 4. Thus, the hand does not directly handle the minnow 24, it is held safely trapped in the cone or trap 20, while the fish hook is inserted therein. Then, when the hooking operation is completed, the minnow on the fish hook 26 is drawn through the open end 23 against the resistance thereof, and the fishing operation is ready to begin.

Thus, the operator does not actually directly handle the minnow 24, either in catching it in the bait box or in holding it while inserting the fish hook 26. He holds the trap safely away from the area of the fish hook while the fish hook is inserted into the minnow, thus minimizing any chance of injuring himself with the fish hook, and the minnow is handled gently and is not injured by being mishandled or dropped on the floor of the boat or the dock where the fishing is taking place, the minnow thus being handled gently except for the insertion of the hook therein. This keeps injury to the minnow at the minimum, and the live minnow therefore will swim in the water in a natural manner to attract fish for the hook 26 on the line 28.

Although this invention has been described in considerable detail, such description is intended as being illustrative rather than limiting, since the invention may be variously embodied, and the scope of the invention is to be determined as claimed.

I claim:

1. A cone funnel bait minnow dipper and holder comprising a large inverted open-ended cone, a small inverted open-ended cone, a collar securing the large end of said small cone to the small end of said large cone, and a handle secured to the large end of said larger cone, said small cone being made of longitudinally extending spring wires secured only at one end to said collar, the large end of said spring wire cone being of sufficient size to readily admit a bait minnow therethrough, the small end of said spring wire cone being too small to normally pass the bait minnow therethrough except under an outside force.

2. The dipper and holder of claim 1, said large cone being of flexible material.

3. The dipper and holder of claim 2, said flexible material being net material.

4. A funnel shaped dipper and holder for use in baiting a fish hook with a live bait minnow comprising a handle member, a loop on said handle member, and a three part funnel member consisting of an upper inverted cone, a collar and a lower inverted cone secured at its large end by said collar to the small end of said upper inverted cone, said upper inverted cone being a bait minnow catcher, said lower inverted cone being a plurality of longitudinally extending and converging spring wires secured at one end only to said collar.

5. A funnel shaped live bait minnow dipper and holder for use in baiting a fish hook comprising a cone-shaped fish dip net, open at both ends, a handle having a loop to which the wide end of the fish net is secured, a collar to which the narrow end of the fish net is secured, said collar having an opening permitting only a single bait minnow to pass freely therethrough at one time, and a plurality of longitudinally extending spring fingers secured at one end to said collar, said fingers having a length greater than that of a live bait minnow, said fingers being mounted on said collar to form a converging cone having an open end too small to pass a bait minnow therethrough under the weight or action of the live bait minnow, said fingers being spaced apart to permit a fish hook to be inserted between two selected fingers into the live bait minnow held therein, said spring fingers being yieldable under sufficient force to permit the hooked bait minnow to be forced through the small cone end of said fingers.

6. A funnel shaped dipper and holder for use in baiting a fish hook with a live bait minnow comprising an inverted cone-shaped fish dip net open at both ends, a loop on which the upper wide end of said dip net is secured, a handle extending from said loop, a collar to which the small end of said dip net is secured, the internal diameter of said collar being sufficient to readily pass the live bait minnow therethrough, a plurality of yieldable spring fingers secured at one end only to said collar and longitudinally extending therefrom in a narrow inverted cone to an opening yieldably preventing the live bait minnow from passing therethrough under its own weight or force, said spring fingers being spaced apart to permit a fish hook to be inserted between two selected spring fingers into the bait minnow held therein, said fingers being yieldable to permit the hooked bait minnow to be forcibly drawn through said small open end of said spring fingers.

References Cited in the file of this patent

UNITED STATES PATENTS

| | | |
|---|---|---|
| 135,391 | Way | Jan. 28, 1873 |
| 149,918 | Clough | Apr. 21, 1874 |
| 2,502,816 | Bennek | Apr. 4, 1950 |
| 2,531,551 | Brecht et al. | Nov. 28, 1950 |